(12) United States Patent
Roth

(10) Patent No.: US 8,927,883 B2
(45) Date of Patent: Jan. 6, 2015

(54) NURSING PLATFORM WITH INTEGRATED WEIGHING MEANS

(75) Inventor: Daniel Lawrence Roth, Newton, MA (US)

(73) Assignee: Daniel Lawrence Roth, Newton, MA (US)

( * ) Notice: Subject to any disclaimer, the term of this patent is extended or adjusted under 35 U.S.C. 154(b) by 296 days.

(21) Appl. No.: 13/494,531

(22) Filed: Jun. 12, 2012

(65) Prior Publication Data

US 2013/0327578 A1     Dec. 12, 2013

(51) Int. Cl.
*G01G 19/52* (2006.01)
*G01G 19/44* (2006.01)
*G01G 21/28* (2006.01)
*A47C 16/00* (2006.01)
*A47D 13/08* (2006.01)
*A47G 9/00* (2006.01)

(52) U.S. Cl.
USPC ........ 177/25.13; 177/144; 177/238; 177/245; 5/655

(58) Field of Classification Search
CPC ..... G01G 5/006; G01G 19/44; G01G 19/445; G01G 19/4146; G01G 19/52; A47C 7/546; A47C 16/00; A47D 13/0836; Y10S 5/922
USPC ......... 177/25.13, 25.19, 144, 238, 245; 5/655
See application file for complete search history.

(56) References Cited

U.S. PATENT DOCUMENTS

| 2,611,604 | A |   | 11/1952 | Sutton et al. |        |
|-----------|---|---|---------|---------------|--------|
| 3,811,523 | A | * | 5/1974  | Artwick et al.| 177/180|
| 4,007,800 | A | * | 2/1977  | Janach et al. | 177/209|
| 5,234,065 | A | * | 8/1993  | Schmidt       | 177/209|
| 5,434,367 | A | * | 7/1995  | Salini        | 177/189|
| 5,499,417 | A |   | 3/1996  | Wang          |        |
| 5,499,457 | A | * | 3/1996  | Weiler et al. | 33/512 |
| 5,581,833 | A |   | 12/1996 | Zenoff        |        |
| 5,790,999 | A | * | 8/1998  | Clark         | 5/655  |
| 5,827,191 | A |   | 10/1998 | Rosenfeld     |        |
| 6,369,338 | B1| * | 4/2002  | Kimura        | 177/25.16 |
| 6,484,337 | B1| * | 11/2002 | Moe et al.    | 5/652  |

(Continued)

FOREIGN PATENT DOCUMENTS

| CN | 201575854 U | 9/2010 |
| FR | 2708343 A1 | 2/1995 |
| WO | 8911264 A1 | 11/1989 |
| WO | 2011120524 A1 | 10/2011 |

OTHER PUBLICATIONS

International Search Report & Written Opinion in related international application No. PCT/US13/44946, mailed on Nov. 27, 2013; 9 pages.

(Continued)

*Primary Examiner* — Randy W Gibson
(74) *Attorney, Agent, or Firm* — Schmeiser, Olsen & Watts LLP; Michael A. Rodriguez

(57) ABSTRACT

An infant-nursing platform includes a cushion adapted for supporting a baby while nursing. The cushion has a support surface. Weighing means are disposed within the cushion and operably coupled to the support surface to weigh the baby on the support surface of the cushion. A user interface device is operably coupled to the weighing means to obtain measurement information therefrom. The user interface device and produces an output in response to the measurement information obtained from the weighing means.

21 Claims, 5 Drawing Sheets

(56) References Cited

U.S. PATENT DOCUMENTS

| | | | |
|---|---|---|---|
| 6,711,770 B1 * | 3/2004 | Owens et al. | 5/655 |
| 6,759,605 B2 * | 7/2004 | Montagnino et al. | 177/238 |
| 6,956,175 B1 | 10/2005 | Daly et al. | |
| 2012/0037432 A1 * | 2/2012 | Fiore et al. | 177/45 |

OTHER PUBLICATIONS

Tmart, 44lb/20kg x 10g ABS Plastic 2.8" LCD Professional Baby/Pet Scale, <http://www.tmart.com/44lb-20kg-x-10g-ABS-Plastic-2.8-LCD-Professional-Baby-Pet-Scale__p136500.html>, visited Jan. 11, 2012, (2 pages).

Amazon, "SECA 354 Digital Baby Scale With Removable Cradle", <http://www.amazon.com/SECA-Digital-Scale-Removable-Cradle/dp/B004C3AYD4>, visited Jan. 11, 2012 (3 pages).

Tomy, American Red Cross Soothing Baby Scale, <http://www.thefirstyears.com/product/detail/Y7150?locale=en_US>, visited Jan. 11, 2012, (2 pages).

Mobility Transfer Systems Inc., "Escali Baby Scale", <http://www.mtsmedicalsupply.com/Baby-Scale/1801/BT20/>, visited Jan. 11, 2012, (2 pages).

Medela Inc., "BabyWeigh(TM) Scale", <http://www.medelabreastfeedingus.com/products/227/babyweigh-scale>, visited Jan. 11, 2012, (2 pages).

Medshows, "AS 001 Air Cushioned Baby Scale Air Bed", <http://www.medshows.com/archives/2010/05/04/as-001-air-cushioned-baby-scale-air-bed/>, visited Jan. 11, 2012 (3 pages).

Red Dot, "BS-002 Bubble Infant Scale", en.red-dot.org, visited Jan. 11, 2012, (2 pages).

Professional Retail Service, "SECA 374 Digital Baby Scale", <http://www.oldwillknottscales.com/seca-374.html>, visited Jan. 11, 2012, (4 pages).

Hayden, K.B., "Infant Weighing Device", U.S. Patent No. 945,530, issued on Jan. 4, 1910.

* cited by examiner

NURSING PLATFORM WITH INTEGRATED WEIGHING MEANS

FIELD OF THE INVENTION

The invention relates generally to infant-nursing platforms.

BACKGROUND

A common concern of parents who breastfeed their newborn children is whether their infant is eating enough. The concern is particularly acute when their baby is born prematurely; to a small infant weighing only a few pounds, the feedings of the first months are critical. Mothers are keenly aware of this critical period and can be understandably anxious, especially if they are first-time mothers who are new to breastfeeding.

SUMMARY

In one aspect, the invention features an infant-nursing platform comprising a cushion adapted for supporting a baby while nursing. The cushion has a support surface. Weighing means is disposed within the cushion and operably coupled to the support surface to weigh the baby on the support surface of the cushion. The platform further comprises a user interface device operably coupled to the weighing means to obtain measurement information therefrom. The user interface device produces an output in response to the measurement information obtained from the weighing means.

In another aspect, the invention features a method comprising receiving a baby on a cushion of an infant-nursing platform having an integrated weighing means and a user interface device, weighing, by the weighing means, the baby on the cushion before the baby is fed, weighing, by the weighing means, the baby on the cushion after the baby is fed, and calculating and displaying, by the user interface device, a weight gain of the baby as a result of the feeding.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Described herein are embodiments of infant-nursing platforms that integrate a weighing means (e.g., a scale) with a breastfeeding cushion. In brief overview, the nursing platform enables mothers to weigh their babies conveniently before and after each feeding. A user interface (UI) device can calculate the weight gain and display the approximate number of ounces consumed by the baby during a feeding. Other features provided by the UI device can include displaying the present weight of the baby before, during, or after the feeding, storing a record of the baby's weight and amount consumed over time, recording the elapsed time for each feeding, and tracking the date and time of each measurement to provide additional analytical information to the user. When not being used to nurse the baby, the platform can function as a baby scale for providing absolute weight measurements (e.g., 13.2 lbs).

The UI device can also have communication means for sending and receiving information from a computing device, for example, a mobile smartphone, a tablet computer, a PC, etc. This communication means can upload data from the infant-nursing platform to provide the user with a set of graphical display means for interpreting the data, and can allow the user to download updated software to the infant-nursing platform to add new features or correct software errors.

Figure 1:
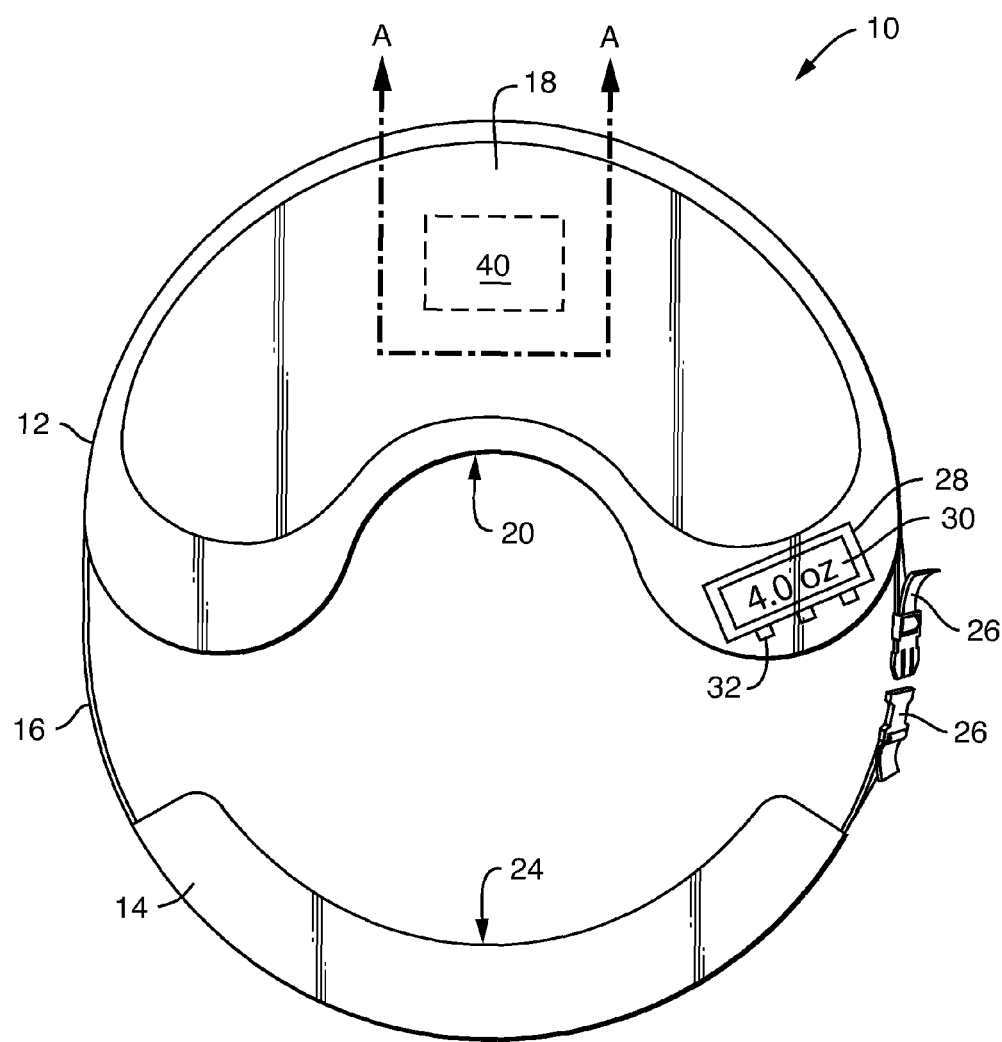
FIG. 1 is a top view of an embodiment of a nursing platform.

FIG. 1 shows a top view of an embodiment of an infant-nursing platform 10 including a support cushion 12 connected to a back pillow 14 by an adjustable strap 16. The design of this embodiment of the infant-nursing platform 10 is for wear about the waist of the nursing woman while she feeds her infant. Infant-nursing platforms 10 can have a variety of sizes to accommodate the waist size of the wearer, the size of the infant, or both. Other embodiments of the infant-nursing platform 10 can exclude the back pillow 14 and strap 16, being designed to sit on the lap of the nursing woman.

The support cushion 12 has a substantially flat support surface 18 upon which the infant can lay during breastfeeding. The support surface 18 may be slightly recessed relative to its immediate surroundings (i.e., a concavity) to assist in keeping the infant situated atop the support cushion 12 (in particular over the weighing means). Other features of the support surface can include a pillow to prop up the head of the baby or to aid in positioning the baby for nursing or weighing (or combinations thereof). The underside of the support cushion 12 can have a contour shaped to fit comfortably on the lap of the nursing mother.

The contour of the support cushion 12, back pillow 14, and strap 16 define a substantially circular or slightly elliptical shape. The support cushion 12 and back pillow 14 are made of a resilient material (e.g., foam) that conforms to the contour of the wearer's lap, waist, hips, and lumbar. In addition, the support surface, underside, and edges of the support cushion 12 and back pillow 14 can be soft and rounded to enhance comfort to the wearer and promote safety to the child. The support cushion 12 has a curved inset region 20 for curving around the wearer's stomach, and the back pillow 14 has an interior arcuate edge 24 for curving around the small of the wearer's back.

At opposite ends of the strap 16 are mating clip ends 26, as an illustrative example of one means of securing the two ends. Other means include hook and loop strips attached to both ends of the strap, for example VELCRO™. A wearer can use the adjustable strap 16 to tighten the infant-nursing platform 10 securely about her waist. Means other than the waist strap 16 can be used to enable the nursing mother to hold or to wear the support cushion 12, for example, straps around the shoulders, handles, sleeves, arms that partially encircle the waist, and combinations thereof.

Integrated into the support cushion 12 is a UI device 28 with a display screen 30. The UI device 28 has buttons or keys 32 by which the wearer can control operation of a weighing means 40 disposed within the support cushion 12 and the information displayed on the display screen 30. As examples, the UI device 28 can display the present weight of the child, changes in weight of the child, or both, as described in more detail below.

Figure 2:
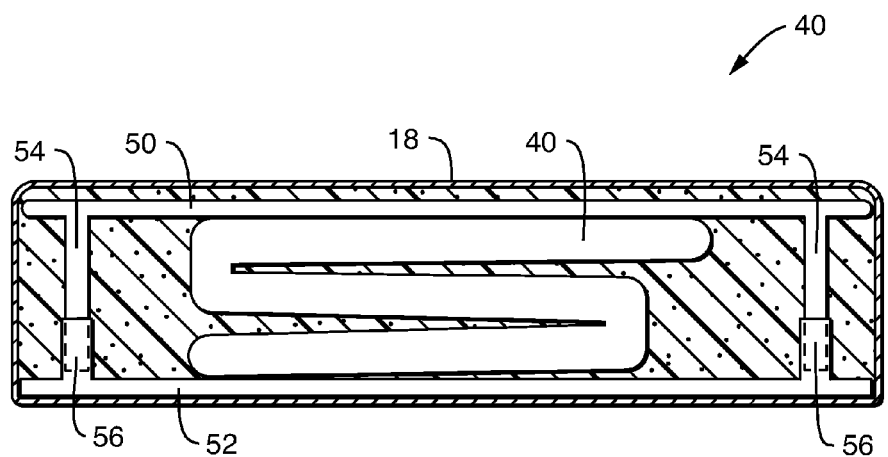
FIG. 2 is a cross-section side view of an embodiment of the nursing platform.

FIG. 2 shows a cross-section side view of the infant-support cushion 12 taken along line AA in FIG. 1. Within the infant-support cushion 12 is one example embodiment of the weighing means 40 disposed between a weight-supporting upper platform 50 and a lower frame portion 52. Extending orthogonally from the upper platform 50 are four guideposts 54, one near each of its corners. Corresponding receptacles 56 of the lower frame portion 52 receive the guideposts 54. The guideposts 54 move up and down within the receptacles 56 in accordance with the weight of an infant placed on the support surface 18 immediately above the upper platform 50. The weighing means 40 measures the weight of the infant on the upper platform 50, preferably having a resolution of 0.1 ounces. Different implementations of the weighing means 40 can be based on producing digital or analog measurements. One example implementation of the weighing means is a strain gage based load cell. Another example implementation of the weighing means comprises a piezoelectric material stretched over the cushion 12 like a fitted sheet and a device for measuring deformation of the piezoelectric material when the baby lays upon the cushion.

Figure 3:
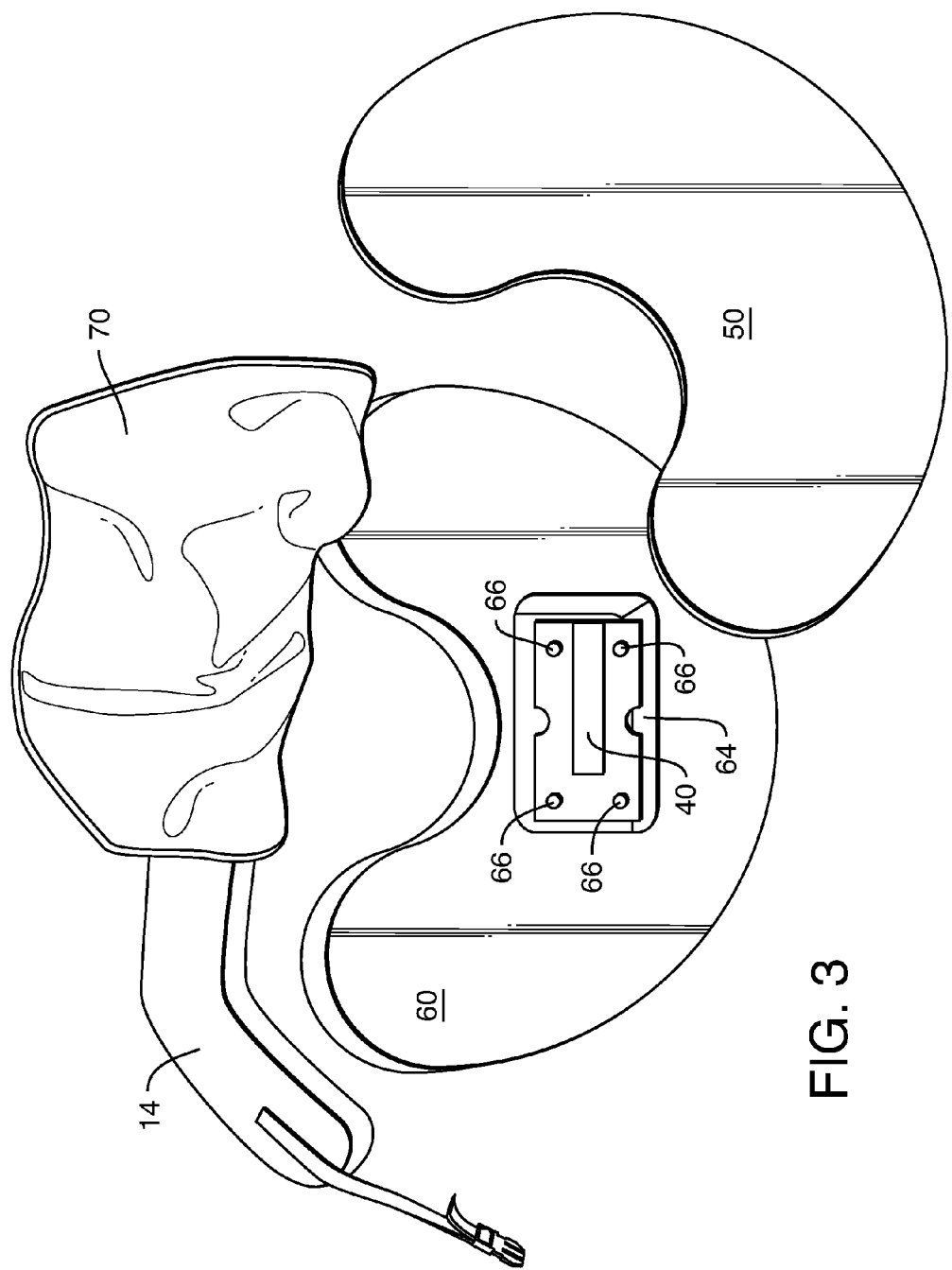
FIG. 3 is an exploded view of the nursing platform.

FIG. 3 shows an exploded view of an embodiment of the infant-nursing platform 10 including the upper platform 50 and foam interior 60 of the support cushion 12. The digital weighing means 40 resides in a compartment 64 in the foam 60. The weighing means 40 has four holes 66 in its corners for receiving fasteners that fix the upper platform 50 to the movable top of the weighing means.

Also shown in FIG. 3 are the back pillow 14 and a fabric cover 70 that wraps around the support cushion 12. Here, the fabric cover 70 is peeled back to one end of the cushion to reveal the interior elements of the support cushion 12.

Figure 4:
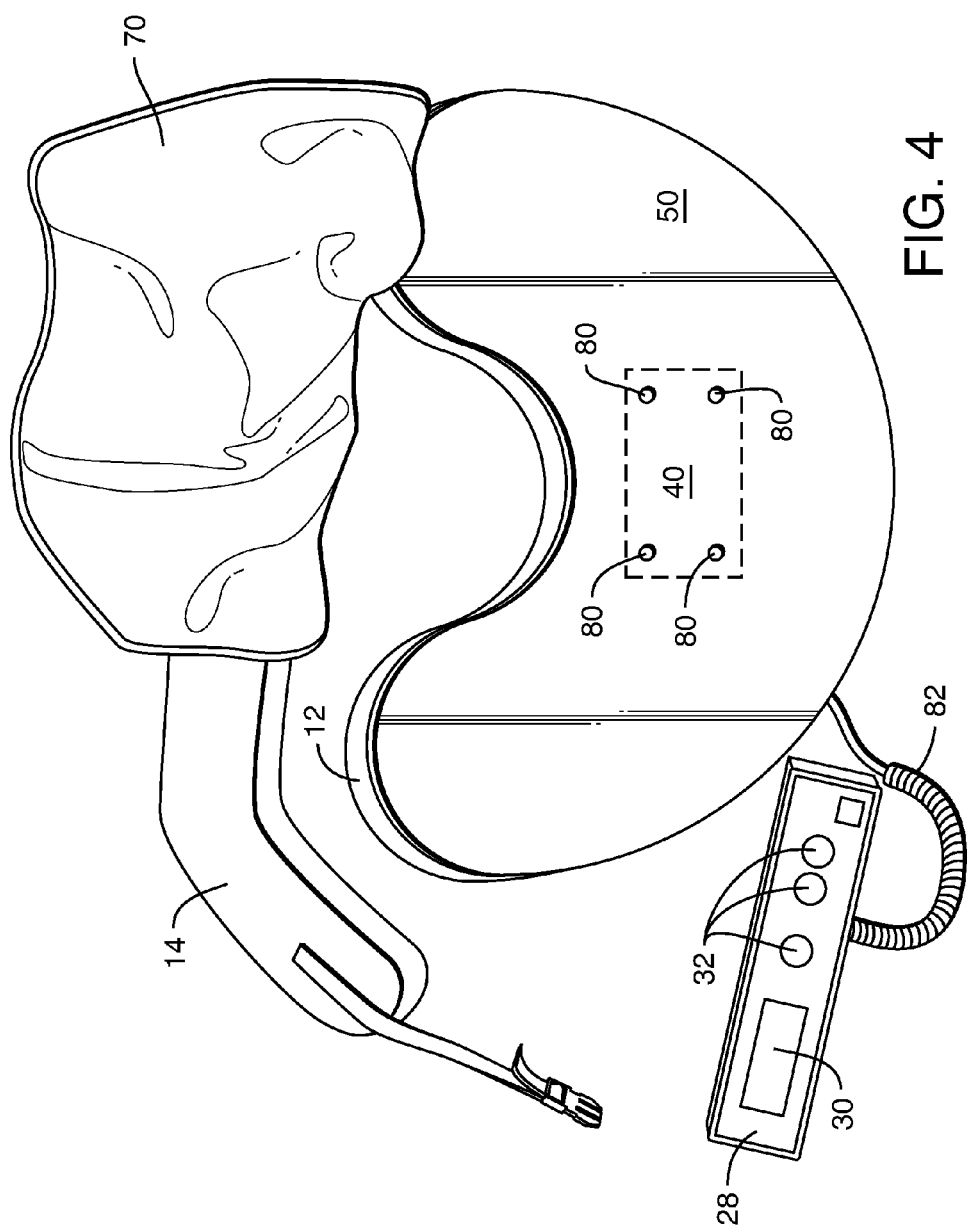
FIG. 4 is a partially assembled view of the nursing platform.

FIG. 4 shows the embodiment of the infant-nursing platform 10 of FIG. 3 as assembled. The upper platform 50 is secured to the weighing means 40 disposed inside of the support cushion 12 by fasteners 80. Like FIG. 3, the fabric cover 70 is peeled back to one end of the support cushion 12 to expose the upper platform 50.

In this embodiment, an electrical cord 82 tethers the UI device to the infant-support cushion 12. The UI device 28 is in electrical communication with the weighing means 40 within the support cushion 12.

The user can control the operation of the weighing means by pressing certain buttons 32 in certain sequences on the front panel of the UI device 28. One button can start and stop the weighing means 40. For example, the user can press this button once to capture an initial weight, and then press the button a second time to capture a post-feeding weight. Using these start and stop weight measurements, the UI device 28 can then calculate and display the weight gain of the infant on the display screen 30. As another form of output, the UI device 28 may include a speaker to indicate audibly the amount of weight gain or the present weight of the baby.

Another button 32 can be for selecting a mode of display. For example, in one mode, the UI device 28 can display the weight of the infant; in another mode, the UI device 28 can display the change in weight of the infant during a feeding; in still another mode, the UI device 28 can display concurrently or alternately the present weight and the change in weight in different regions of the display screen 30. Alternatively, one button 32 can be exclusively for displaying the present weight and a second button dedicated to displaying the weight gain. Display of these values can be continuous throughout a feeding, or the values may appear on the screen in response to a pressing of the button and then fade out or disappear after a predetermined period. In another embodiment, the weighing means 40 can measure, and the UI device 28 can display, the baby's weight in automatic response to the baby being placed on the support surface 18.

To implement such functionality, the UI device 28 includes electrical components (not shown), such as a controller, memory, and a power source (e.g., replaceable batteries). In addition to the above-noted functionality, the controller can be programmed to store a record, in memory, of the weight of the infant measured over time (e.g., a timestamp is captured with each measured weight or each measured change in weight). As another example, the controller can be programmed to compute, record and/or display a length of a feeding (e.g., time between successive pressings of a start and stop button). Example embodiments of the controller include, but are not limited to, a processor (or CPU), a microcontroller, and an ASIC.

Figure 5:
FIG. 5 is a front view of a woman who is nursing a baby using the nursing platform.

FIG. 5 shows a front view of a woman nursing a baby using an embodiment of the infant-nursing platform 10, which rests on her lap while she nurses the baby.

Reference in the specification to "one embodiment" or "an embodiment" means that a particular, feature, structure or characteristic described in connection with the embodiment is included in at least one embodiment of the teaching. References to a particular embodiment within the specification do not all necessarily refer to the same embodiment.

While the invention has been shown and described with reference to specific preferred embodiments, it should be understood by those skilled in the art that various changes in form and detail may be made therein without departing from the spirit and scope of the invention as defined by the following claims. For example, other embodiments of the infant-nursing platform can be integrated with machines or devices for measuring other aspects of a child's physiology, such as temperature, respiration, and heart rate. Examples of such devices include, but are not limited to, thermocouples for taking temperature, EKG electrodes for measuring heart rate, and LED cuffs for measuring oxygenation.

What is claimed is:

1. An infant-nursing platform, comprising:
a substantially C-shaped cushion adapted for supporting a baby while nursing, the cushion having a support surface, the C-shape of the cushion enabling the cushion to wrap partially around a waist of a user while the user feeds the baby;
weighing means disposed within the cushion and operably coupled to the support surface to weigh the baby on the support surface of the cushion; and
a user interface device operably coupled to the weighing means to obtain measurement information therefrom, the user interface device produces an output in response to the measurement information obtained from the weighing means.

2. The infant-nursing platform of claim 1, wherein the cushion is wearable by a user who is nursing the baby.

3. The infant-nursing platform of claim 1, wherein the user interface device is embedded in the cushion.

4. The infant-nursing platform of claim 1, wherein the user interface device is externally connected to the cushion by an electrical cord.

5. The infant-nursing platform of claim 1, wherein the user interface device includes a controller and a display screen.

6. The infant-nursing platform of claim 5, wherein the controller displays the weight of the baby on the display screen.

7. The infant-nursing platform of claim 5, wherein the controller calculates and displays a weight gain of the baby after a feeding session.

8. The infant-nursing platform of claim 7, wherein the display screen displays the weight gain continuously as the feeding session progresses.

9. The infant-nursing platform of claim 7, wherein the display screen displays the weight gain in response to an input command of an operator.

10. The infant-nursing platform of claim 5, wherein the controller calculates a weight gain of the baby after a feeding session and displays the weight of the baby and the weight gain on the display screen simultaneously.

11. The infant-nursing platform of claim 5, wherein the user interface device further includes memory, and wherein the controller stores the measured weight of the baby over time in the memory to retain a record corresponding to a history of the baby's weight.

12. The infant-nursing platform of claim 5, wherein the controller calculates a length of a feeding session.

13. The infant-nursing platform of claim 1, wherein the user interface device includes a single button by which an operator starts and stops operation of the weighing means.

14. The infant-nursing platform of claim 1, wherein the user interface device includes an audio output device.

15. The infant-nursing platform of claim 1, further comprising means for securing the cushion about the waist of the wearer.

16. The infant-nursing platform of claim 1, further comprising a back pillow connected to the cushion by a strap.

17. A method, comprising:
receiving a baby on a substantially C-shaped cushion of an infant-nursing platform being worn partially around a waist of a user, the infant-nursing platform having an integrated weighing means and a user interface device;
weighing, by the weighing means, the baby on the cushion before the baby is fed;
weighing, by the weighing means, the baby on the cushion after the baby is fed; and
calculating and displaying, by the user interface device, a weight gain of the baby as a result of the feeding.

18. The method of claim 17, further comprising displaying a current weight of the baby on the cushion during and after the feeding.

19. The method of claim 17, wherein the displaying of the weight gain occurs continuously while the baby is being fed.

20. The method of claim 17, further comprising storing the measured weight of the baby over time to produce a record corresponding to a history of the baby's weight.

21. The method of claim 17, further comprising calculating duration of the feeding of the baby.

* * * * *